Oct. 8, 1974  D. M. PRICE  3,840,678
EDIBLE SPOONING DEVICE
Filed June 3, 1970
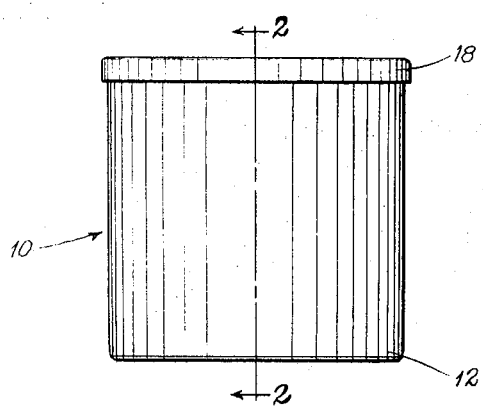
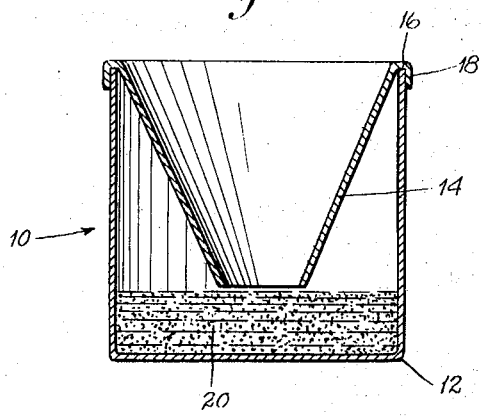
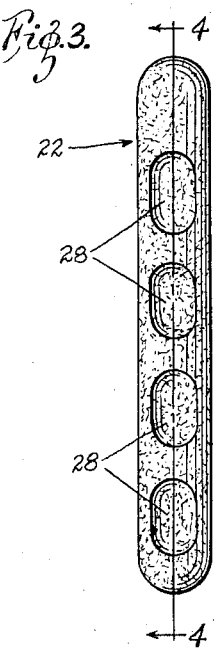
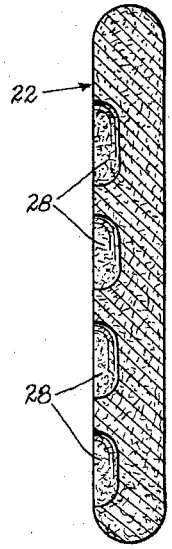
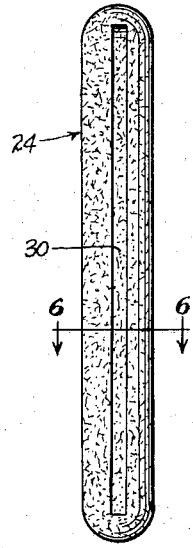
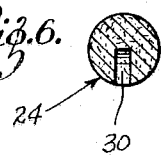
INVENTOR:
DAN M. PRICE,
BY Rogers, Ezell, Eilers & Robbins
ATTORNEYS

United States Patent Office 3,840,678
Patented Oct. 8, 1974

3,840,678
EDIBLE SPOONING DEVICE
Dan M. Price, Litchfield, Ill., assignor to Stick N'Dip, Inc., Litchfield, Ill.
Filed June 3, 1970, Ser. No. 42,950
Int. Cl. A23l 1/00
U.S. Cl. 426—104
4 Claims

ABSTRACT OF THE DISCLOSURE

An edible spooning device includes a plurality of spaced cavities for spooning edible material with said cavities spaced and dimensioned to allow consumption of the device and spooned material contained in each cavity with a normal sized bite. Additional spooning means extends from one end of the device.

BACKGROUND OF THE INVENTION

1. Field Of The Invention

The present invention relates to the quick food art, and more particularly to a novel container comprising a non-spill cup, or the like, for fluid food and a novel bread stick spoon for dipping fluid food.

2. Description Of The Prior Art

In the prior public use and patented art are many quick food items, including both food and service aids. Hamburger and other sandwich sales outlets abound. However, there have long remained a need for adequate ways and means of quickly dispensing fluid food, which the present invention supplies.

SUMMARY OF THE INVENTION

In brief, the present novel quick food items include a non-spill cup, or the like, having an inner cone preventing outflow of fluid food upon overturning of the cup, and dippers comprising bread sticks having preformed recesses, and the like, for dipping fluid food from the cup, and the like. One bread stick modification includes a small spoon extending from one end.

Hence, an object of the present invention is to provide novel items for rapid dispensing and fast eating of fluid foods; particularly a non-spill cup for fluid foods and bread sticks with cavities, and the like, for dipping fluid food from such cup. Other objects are to provide novel bread sticks formed to serve, in effect, as an ever shortening spoon in eating fluid food from a cup, or the like, being consumable bite by bite with the dipped fluid food, and to provide such a bread stick having a spoon extending axially from one end. These, and other objects and advantages are apparent from the following description taken with the accompanying drawings.

BRIEF DESCRIPTION OF THE DRAWINGS

FIG. 1 is a side elevational view of a cup incorporating the teachings of the present invention;

FIG. 2 is a vertical diametric cross-sectional view taken on the line 2–2 of FIG. 1;

FIG. 3 is a plan view of a bread stick including the principles of the present invention;

FIG. 4 is a vertical longitudinal cross-sectional view taken substantially on the line 4–4 of FIG. 3;

FIG. 5 is a plan view of a modified bread stick;

FIG. 6 is a vertical transverse cross-sectional view taken substantially on the line 6–6 of FIG. 5; and FIG. 7 is a plan view of a further modified bread stick dipper with spoon.

DESCRIPTION OF THE PREFERRED EMBODIMENT

Referring to the drawings more particularly by reference numerals, 10 indicates generally a cup incorporating teachings of the present invention, which includes a base 12 and a cone 14 supported from the rim 16 of the base 12 by a flange 18 pressed into clamping engagement with said rim 16. Fluid food 20 is dispensed in the cup 10, the level thereof being maintained below the cone 14 so that it will not spill out or overflow the cone 14 if the cup 10 is overturned.

Dippers or spoons in the form of bread sticks 22, 24 and 26 are provided (FIGS. 3, 5 and 7, respectively). The bread stick 22 includes longitudinally spaced cavities 28 which may take any desired configuration. Preferably, the spacing of the cavities 28 allows one per average bite with dipped food. The bread stick 24 includes a single longitudinal trench 30, which may, if desired, be divided into shorter trenches on the principle of the spacing of the cavities 28. The bread stick 26 is similar to the bread stick 24, but includes a spoon 32 extending from one end, which is convenient for some purposes. Other forms of bread sticks suitable for dipping fluid food may be provided.

It is clear that fluid food 20 may be dipped from the cup 10 by any of the bread sticks 22, 24 and 26, and the fluid food taken into the mouth from the bread sticks, or consumed bite by bite with them. The present quick food product is a welcome substitute for the ever present quick sandwich.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A product for eating foodstuff comprising an elongated body of edible material, at least a portion of the body including means for spooning the foodstuff, and an additional spooning means of a nonedible material extending outwardly from one end of the body.

2. The product of claim 1 wherein the body includes a plurality of longitudinally spaced food receiving cavities for spooning the foodstuff with partitions of edible material there-between, the cavities and partitions being dimensioned to allow consumption of the product with normal sized bites between adjacent cavities.

3. The product of claim 1 wherein the body includes a continuous groove running longitudinally of the body adaptable for spooning the foodstuff.

4. A product for eating foodstuff comprising an elongated body of edible material, the body including a plurality of longitudinally spaced food receiving cavities for spooning the foodstuff with partitions of edible material therebetween, the cavities and partitions being dimensioned to allow consumption of the product with normal sized bites between adjacent cavities, and additional spooning means extending outwardly from one end of the body.

References Cited

UNITED STATES PATENTS

| D. 165,898 | 2/1952  | Biehl          | D1—21         |
| 2,810,338  | 10/1957 | Dawson         | 99—87 UX      |
| 3,384,495  | 5/1968  | Potter et al.  | 99—81 X       |
| D. 193,541 | 9/1962  | Gordon         | D1—2          |
| 2,064,411  | 12/1936 | Brandstein     | 99—171(c) UX  |
| 3,223,272  | 12/1965 | Vernon         | 220—90        |

JAMES R. HOFFMAN, Primary Examiner

U.S. Cl. X.R.

426—132